United States Patent
Early et al.

[15] 3,674,718
[45] July 4, 1972

[54] DIELECTRICALLY HEAT SEALABLE POLYURETHANE FOAM

[72] Inventors: Robert M. Early, North Branford; Maurice C. Raes, Branford, both of Conn.

[73] Assignee: Olin Corporation
[22] Filed: Oct. 22, 1970
[21] Appl. No.: 38,121

[52] U.S. Cl. ............260/2.5 AQ, 260/2.5 AM, 260/2.5 AS, 260/2.5 AP
[51] Int. Cl. ...............C08g 22/44, C08g 22/08, C08g 22/14
[58] Field of Search ...............260/2.5 AM, 2.5 AQ, 2.5 AS, 260/77.5 AQ, 77.5 AS, 77.5 AM, 75 NQ, 75 NM, 2.5 AP

[56] References Cited

UNITED STATES PATENTS

| | | | |
|---|---|---|---|
| 3,472,800 | 10/1969 | Kuryla | 206/2.5 AS |
| 3,350,389 | 10/1967 | Patton | 260/2.5 X |
| 3,345,309 | 10/1967 | Merton | 260/2.5 |
| 3,274,130 | 9/1966 | Oertel | 260/2.5 |
| 3,257,339 | 6/1966 | Hostettler | 260/2.5 |
| 3,255,253 | 6/1966 | Kuryla | 260/77.5 AQ |
| 3,256,213 | 6/1966 | Gmitter | 260/2.5 AT |

FOREIGN PATENTS OR APPLICATIONS

| | | | |
|---|---|---|---|
| 1,157,387 | 11/1963 | Germany | 260/2.5 AQ |
| 1,567,663 | 5/1969 | France | |

OTHER PUBLICATIONS

Physical Organic Chemistry; Hine; McGraw-Hill; N.Y. 1962; pages 16 to 18

*Primary Examiner*—Donald E. Czaja
*Assistant Examiner*—C. Warren Ivy
*Attorney*—F. A. Iskander, Gordon D. Byrkit, Donald F. Clements, Thomas P. O'Day and E. Zagarella

[57] ABSTRACT

Highly polar, reactive-hydrogen-containing compounds are incorporated in a polyether polyurethane foam-forming reaction mixture to obtain a foam having dielectrically heat sealable properties.

10 Claims, No Drawings

DIELECTRICALLY HEAT SEALABLE POLYURETHANE FOAM

This invention relates to flexible, dielectrically heat sealable polyurethane foam compositions of the polyether type, and to a method of preparing such foams.

In many applications in which flexible polyurethane foams are used, it is desired to adhere the foam to a layer or film of another plastic material. For example, stool cushions are made by adhering a layer or block of flexible polyurethane foam to a cover layer of vinyl resin.

Several heat sealing methods are known in the art for laminating plastic sheets together, which methods preclude the use of an adhesive. One such method, which is particularly desirable in view of its speed and ease of application, is the so-called dielectric heat sealing method. This comprises pressing the layers to be adhered together between two surfaces while applying a high-frequency voltage thereto. The heat generated by this voltage fuses the layers at the inter-face, and upon cooling and solidification of the fused inter-face, the layers become permanently bonded together. This and other heat sealing methods in general have been successfully employed in laminating polyester, but not polyether polyurethane foam to other materials. In the case of polyurethane foam of the polyether type, difficulty was encountered in permanently heat sealing them to other materials.

One of the early attempts to overcome this difficulty is described in U.S. Pat. No. 3,205,120 to Flanders, issued Sept. 7, 1965. This patent discloses heat sealable polyether polyurethane foam compositions comprising a minor proportion of a low-molecular-weight polyol selected from the group consisting of a polyoxyalkylene polyol, a hydroxyaliphatic ester of a phosphorus acid, and a hydroxyl-containing natural oil. However, difficulty has been encountered in successfully employing the dielectric heat sealing method to bond the Flanders foams to other plastic materials.

Other attempts at successfully heat sealing polyether polyurethane foam to other materials have included using a particular organic polyisocyanate in the foam-forming reaction mixture (see U.S. Pat. No. 3,497,416), incorporating conductive particles in the foam (see U.S. Pat. No. 3,499,848) which particles may otherwise alter the physical properties of the foam, and applying a thin layer of a dipolar material to the foam surface before sealing it to another plastic sheet material (see U.S. Pat. No. 2,859,153).

In the art of utilizing plastic materials to make electrical capacitors and electroluminescent cells, U.S. Pat. No. 3,161,539 discloses the concept of incorporating cyanoethylated sucrose in a plastic composition to increase its dielectric constant without substantially increasing its dissipation factor. Thus an improved insulating material is obtained which is capable of storing electrical energy with minimum loss thereof due to the transformation of electric energy into heat. Not only is there no suggestion in the patent concerning the use of this cyanoethylated material in imparting dielectrically sealable properties to plastic materials in general, and plastic foam in particular, but the teachings of the patent lead away from such utility in view of the very low dissipation factor obtained by incorporating the cyanoethylated sucrose in the plastic composition, which of course means very low conversion of electric energy into heat.

Now it has been found, in accordance with this invention, that flexible, polyether polyurethane foams can be rendered dielectrically heat sealable by including in the foam-forming reaction mixture a relatively small amount of a polar, reactive-hydrogen-containing compound. More specifically, dielectrically heat sealable polyether polyurethane foams are prepared, according to the teachings of the invention, by incorporating in the foam-forming reaction mixture from about 5 to about 30 parts by weight, based on the total weight of the polyurethane foam-forming reaction mixture, of a polar, reactive-hydrogen-containing compound having in the molecule at least one group the dipole moment of which ranges from about 2 to about 6 Debye units.

As is well-known in the art, the polarity of a chemical compound depends on its molecular structure, i.e., the types and frequency of polar groups contained in the molecule. This polarity is expressed in terms of group dipole magnitude or moment, a dipole consisting of two equal electrical charges, very close together but opposite in sign. The moment of a dipole, expressed in Debye units (each Debye unit being equal to $10^{-18}$ electrostatic units) is calculated by multiplying either charge by the distance between the two charges. The dipole moments for various chemical bonds or groups are provided in Lange's Handbook of Chemistry, 8th Edition, page 1,257. To illustrate, the dipole moments for a hydroxyl-methyl bond, a nitrile-ethyl bond, and a methyl-methyl bond are 1.66, 3.57, and 0, respectively.

In accordance with the teachings of the invention, any reactive-hydrogen-containing compound having polar groups, the dipole moment of each group being between about 2 and about 6, and preferably between about 2.5 and about 5, Debye units, may be incorporated in a polyether polyurethane foam-forming reaction mixture to impart dielectrically heat sealable properties to the foam. Thus included here are the mono-alcohols, the polyols, the amines, and the polyamines, all of which have in the molecule substituent polar groups such as ketone, nitro, sulfone, carbonate, or cyanoalkyl groups.

However, it is preferred to employ reactive-hydrogen-containing compounds in which the polar substituent groups are cyanoethyl groups. Thus, in accordance with the preferred embodiment of the invention, reactive-hydrogen-containing compounds having at least one cyanoethyl group per reactive hydrogen are employed.

These cyanoethylated, reactive-hydrogen-containing compounds can be prepared by partially cyanoethylating (using acrylonitrile) a polyfunctional initiator having 2 to 8 reactive hydrogens per molecule, in the presence of an alkaline catalyst. To effect only partial cyanoethylation, the acrylonitrile is employed in a molar proportion which is less than the number of reactive hydrogens in the polyfunctional initiator molecule. Thus if the polyfunctional initiator contains 6 reactive hydrogens per molecule, from 3 to 5 moles of acrylonitrile are employed per mole of this initiator. A detailed description of the cyanoethylation reaction is provided in U.S. Pat. No. 3,437,905 to Bruson, issued Mar. 16, 1948. The entire disclosure of this patent is incorporated herein by reference.

Any polyfunctional initiator having from 2 to 8 reactive hydrogens per molecule can be employed in preparing the cyanoethylated, reactive-hydrogen-containing compounds for use in the invention; and the term "polyfunctional initiator", as used in the specification and claims herein, is intended to encompass any such compound.

Representative polyfunctional initiators include, but are not limited to, the glycols such as ethylene glycol, the triols such as glycerol and trimethylolpropane, higher functionality alcohols such as pentaerythritol and inositol, the saccharides such as sucrose, glucose, fructose and alkyl glucoside, the aliphatic and aromatic polyamines such as ethylene diamine and toluene diamine, the hydroxyalkylated polyamines such as hydroxypropylated ethylene diamine and hydroxyethylated toluene diamine. Another group of suitable polyfunctional initiators includes the alkylene oxide adducts of polyhydroxy compounds and saccharides such as oxypropylated glycerol, oxybutylated trimethylolpropane, oxypropylated sucrose, oxypropylated methyl glucoside, and so forth.

The preferred polyfunctional initiators are the polyols, i.e., polyfunctional initiators in which the reactive hydrogens are hydroxyl hydrogens. Representative of these are the saccharides, the alkylene oxide adducts of the saccharides, and other polyols and their alkylene oxide adducts. The saccharides and their alkylene oxide adducts are particularly preferred.

Illustrative of the polar, reactive-hydrogen-containing compounds employed according to the invention are the following:

tris-(2-cyanoethyl) glucose tris-(2-cyanoethoxypropyl)-bis-(hydroxypropyl) glucose
hexakis-(2-cyanoethyl) sucrose
hexakis-(2-cyanoethoxypropyl)-bis-(hydroxypropyl) sucrose
hexakis-(2-cyanoethoxyethyl)-bis-(hydroxyethyl) sucrose
bis-(hydroxy-polyoxypropyl)-bis-(2-cyanoethylpolyoxypropyl) methyl glucoside
1,2-di-(2-cyanoethoxy)-3-hydroxypropane
tetrakis-(2-cyanoethoxy) dihydroxyhexanes
tetrakis-(2-cyanoethoxypropoxy)-bis-(hydroxypropoxy) hexanes
N,N'-bis-(2-cyanoethyl)2,4-toluene diamine
N,N'-bis-(2-cyanoethyl)-N,N'-bis-(hydroxypropyl)2,4-toluene diamine
N,N'-bis-(2-cyanoethoxypropyl)-N,N'-bis-(hydroxypropyl)2,6-toluene diamine
N-(2-cyanoethyl) aniline
hydroxy-polyoxyethyl-tris-(2-cyanoethylpolyoxyethyl) pentaerythritol
bis-(hydroxy-polyoxyethyl)-bis-(2-cyanoethylpolyoxyethyl) pentaerythritol
hydroxy-polyoxypropyl-tris-(2-cyanoethylpolyoxypropyl) pentaerythritol
bis-(hydroxy-polyoxypropyl)-bis-(2-cyanoethylpolyoxypropyl) pentaerythritol
tris-(hydroxy-polyoxypropyl)-tris-(2-cyanoethylpolyoxypropyl) sorbitol In the above list of applicable, polar reactive-hydrogen-containing compounds, the following are preferred:
tris-(2-cyanoethyl) glucose
tris-(2-cyanoethoxypropyl)-bis-(hydroxypropyl) glucose
hexakis-(2-cyanoethyl) sucrose
hexakis-(2-cyanoethoxypropyl)-bis-(hydroxypropyl) sucrose
hexakis-(2-cyanoethoxypropyl)-bis-(hydroxyethyl) sucrose
bis-(hydroxy-polyoxypropyl)-bis-(2-cyanoethylpolyoxypropyl) methyl glucoside
bis-(hydroxy-polyoxypropyl)-bis-(2-cyanoethylpolyoxypropyl) pentaerythritol
tris-(hydroxy-polyoxypropyl)-tris-(2-cyanoethylpolyoxypropyl) sorbitol In the preparation of the polyurethane foam-forming reaction mixture for use in this invention, either the so-called "one-shot method" or the "semi-prepolymer technique" may be employed. Any combination of polyether polyols, organic polyisocyanate, foaming agent, catalyst, and other reactants capable of forming a flexible polyurethane foam can be employed in carrying out the process of this invention; and the term "polyurethane foam-forming composition" in the specification and claims herein is meant to include any such combination. Typical formulations are described in U.S. Pat. No. 3,072,582, issued Jan. 8, 1963, and Canadian Pat. No. 705,938, issued Mar. 16, 1965.

To further illustrate suitable formulations, the polyether polyols, useful for the preparation of the polyurethane material of this invention, include oxyalkylated polyhydric alcohols having a molecular weight in the range between about 200 and about 10,000 and preferably between about 1,000 and 8,000. The hydroxyl number of the polyether polyol is generally less than about 250 and preferably in the range between about 20 and about 175. These oxyalkylated polyhydric alcohols are generally prepared by reacting, in the presence of an alkaline catalyst, a polyhydric alcohol and an alkylene oxide such as ethylene oxide, propylene oxide, butylene oxide, amylene oxide, epichlorohydrin, and mixtures of these alkylene oxides, by either random addition or step-wise addition, as is well-known in the art. If desired, a portion of the polyether polyols may be replaced with another compound having at least two reactive hydrogen atoms, such as a diol, an alkyl amine, an alkylene polyamine, a cyclic amine, an amide, or a polycarboxylic acid.

In a preferred embodiment of the invention, a polyol blend is employed comprising a polyether triol, having a molecular weight range of about 1,000–8,000 and a hydroxyl number range of about 20–175, and a diol having a molecular weight range of about 60–3,000 and a hydroxyl number range of about 50–200. The weight ratio of polyether triol to diol, according to this preferred embodiment, can range from about 1:8 to about 6:8.

The organic polyisocyanates used in the preparation of the polyurethane foam-forming reaction mixture include toluene diisocyanate, ethylene diisocyanate, propylene diisocyanate, methylene-bis-(4-phenylisocyanate), 3,3'-bitoluene-4,4'-diisocyanate, hexamethylene diisocyanate, naphthalene-1,5-diisocyanate, polyphenylene polymethylene polyisocyanate, mixtures thereof and the like. The amount of polyisocyanate employed in the process of this invention should be sufficient to provide at least about 0.7 NCO group per reactive hydrogen present in the total reaction system. An excess of isocyanate compound may be conveniently employed; however, this is generally undesirable due to the high cost of the isocyanate compounds. It is preferable, therefore, to employ sufficient polyisocyanate to provide no greater than about 1.25, and preferably between about 0.9 and about 1.15, NCO groups per reactive hydrogen.

The polyurethane foam-forming reaction mixture also contains a foaming agent, a reaction catalyst, and preferably a small proportion of a conventional surfactant. The foaming agent employed may be any of those known to be useful for this purpose, such as water, as well as organic foaming agents containing up to about seven carbon atoms such as the halogenated hydrocarbons, lower molecular weight alkanes, alkenes, ethers and mixtures thereof. Typical halogenated hydrocarbons include, but are not limited to, monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof, and the like. It is preferred, however, to use water, either alone or in combination with an organic foaming agent.

The amount of foaming agent employed may be varied within a wide range. Generally, however, the halogenated hydrocarbons are employed in an amount from about 1 to 50 parts by weight per 100 parts by weight of the polyol, and water is generally employed in an amount from about 1.0 to 6.0 parts by weight per 100 parts by weight of the polyol.

The polyurethane foam-forming reaction mixture further contains a catalytic amount of a reaction catalyst. The catalyst employed may be any of the catalysts known to be useful for this purpose, or mixtures thereof, including tertiary amines and metallic salts, particularly stannous salts. Typical tertiary amines include, but are not limited to, the following: N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Any catalytic proportion of catalysts may be employed. Preferably, a mixture of amine and metallic salt is employed as the catalyst. The catalyst or catalyst mixture, as the case may be, is usually employed in an amount ranging between about 0.05 and about 1.5, and preferably between about 0.075 and about 0.50 percent by weight of the polyol.

It is preferred in the preparation of the polyurethane foam-forming reaction mixture to employ minor amounts of a conventional surfactant in order to further improve the cell structure of the polyurethane foam. Typical of such surfactants are the silicone oils and soaps, and the siloxane-oxyalkylene block copolymers. U.S. Pat. No. 2,834,748 and T.H. Ferrigno, Rigid Plastic Foams (New York: Reinhold Publishing Corp., 1963), pp. 38–42, disclose various surfactants which are useful for this purpose. Generally up to 2 parts by weight of the surfactant are employed per 100 parts of the polyol.

Various additives may also be employed which serve to impart different properties, to the resulting foam e.g., fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may also be included in the foam-forming composition.

As indicated earlier, the dielectrically heat sealable, flexible, polyether polyurethane foam composition of the invention is prepared by incorporating in the foam-forming reaction mixture from about 5 to about 30 percent by weight of a polar, reactive-hydrogen-containing compound as described above. A preferred percentage range of the polar compound is about 10–25 percent by weight.

The polar, reactive-hydrogen-containing compound is added to the foam-forming reaction mixture before foaming. Conveniently, it may be blended with the polyether polyol used in making the foam, and the blend is then reacted with the other ingredients of the foam-forming mixture.

It will become apparent that the polar compound employed according to the invention, due to its having free reactive hydrogens in the molecule, acts as a co-reactant in the foam-forming reaction. To this extent it is in effect a partial replacement for the polyol used in making the foam. This is important from an economic standpoint. It is also of significance in that it enables making dielectrically heat sealable polyether polyurethane foams without resorting to a particular additive for this purpose which additive is otherwise foreign to the foam-forming system and may therefore alter the properties of the resulting foam.

As a result of the inclusion of the requisite proportion of the polar, reactive-hydrogen-containing compound in the polyurethane foam-forming reaction mixture, the resulting foam is rendered dielectrically heat sealable to other thermoplastic sheet materials such as polyvinyl chloride, polyvinylidene chloride, polyester, plastic-treated fabrics and so forth. This desirable result is accomplished, as noted above, without the basic properties of the foam being otherwise degraded or altered.

The phenomenon of dielectric heat sealability of the polyurethane foam compositions of the invention is attributed to a high dissipation factor, i.e., high rate of conversion of electrical energy into heat, which is characteristic of these compositions. This in turn is due to the presence, in the foam, of the polar groups supplied by the polar reactive-hydrogen-containing compound. These polar groups, upon the application of a high frequency voltage to the foam, vibrate at a very fast rate, and this vibration results in a fast rate of dissipation or conversion of electrical energy into heat; and the heat so generated is in effect utilized to weld the foam to another thermoplastic material which is pressed against the foam surface, by softening or melting both materials at the inter-face or regions of contact. Thereafter, the voltage is cut off and the fused inter-face allowed to cool and solidify. The bond resulting at the inter-face is strong and permanent.

The dielectrically heat sealable polyurethane foams of the invention are of utility in a variety of commercial and industrial applications. Thus they can be used to make cushions having a cover layer or film of vinyl or other plastic sheet material. They are also useful in making paddings, consisting of an inner core of foam sandwiched between two outer layers of plastic or plastic-treated fabric, shoe inner soles, and so forth.

The following examples are provided to illustrate the invention. In these examples all parts and percentages are by weight unless otherwise specified.

EXAMPLE 1

A flexible, polyurethane foam-forming reaction mixture was prepared from the following ingredients in the indicated proportions:

| Ingredients | Parts by Weight |
|---|---|
| Oxypropylated glycerol, mol. wt. 3,000 | 80.0 |
| Bis-(hydroxypolyoxypropyl)-bis-(2-cyanoethylpolyoxypropyl) methyl glucoside, mol. wt. 582, dipole moment per cyanoethyl group 3.57 | 20.0 |
| Triethylene diamine | 0.3 |
| Stannous octoate | 0.2 |
| Silicone surfactant* | 1.5 |
| Water | 4.0 |
| Toluene diisocyanate | 43.7 |

*Dow Corning Silicone Surfactant DC-190

The above mixture was dispensed into a square box having side dimensions of 10 inches and a height of 4 inches. After bubbles appeared on the surface of the foam indicating completion of the foaming, the foam was removed from the box and cured for 3 minutes in a 120° C. oven. After cooling to room temperature, the foam was examined and it was found to be free of defects and to have good physical properties as indicated in the table below.

A section, one-half inch thick, 8 inches long and 4 inches wide, was cut out of the foam. A sheet of polyvinyl chloride plastic, having approximately the same dimensions was placed on top of the foam section, and the composite was placed in a sealing apparatus. This consisted of a grounded, conductive metal platform, supporting the composite, and a one-fourth inch wide sealing bar or press activated by a hydraulic press and connected to a 30-megacycle voltage generator (Model 15–5KW, made by Industron Corporation) capable of generating up to 1,000 radio frequency volts. With an average pressure of 30 pounds per square inch applied to the composite by means of the sealing press, a 30-megacycle/second voltage of about 360 volts was generated for about 2.5 seconds. The voltage was then cut off and the composite maintained under pressure for an additional 5 seconds. Thereafter, the pressure was released and the foam-vinyl laminate was removed. It was found that a strong, uniform, and permanent bond had been achieved between the vinyl and the foam. The bond strength, expressed in pounds per inch, was evaluated by measuring the average tensile peeling or delaminating force required to delaminate the vinyl-foam composite. A tensile machine, designed for this purpose and made by Instron Engineering Corporation (Ser. No. 1165, Table Model), was used. The bond strength measured at 1.125 pound per one-fourth inch or 4.5 pounds per inch.

COMPARATIVE TEST

For purposes of comparison, the identical procedure of Example 1 was followed except that in the foam-forming reaction mixture, instead of 80 parts of oxypropylated glycerol and 20 parts of bis-(hydroxy-polyoxypropyl)-bis-(2-cyanoethyl-polyoxypropyl) methyl glucoside, 100 parts of the oxypropylated glycerol were used. The resulting foam, while having similar physical properties to the foam prepared in Example 1, could not be successfully dielectrically sealed to the vinyl even upon increasing voltage to 700 volts. This shows that the inclusion of the cyanoethylated methyl glucoside derivative in the foam-forming reaction mixture imparts dielectric properties to the foam without otherwise altering its other desirable properties. The properties of the foam prepared according to this Comparative Test are provided in the table below.

EXAMPLE 2

The identical procedure of Example 1 was again used except that in the foam-forming reaction mixture, instead of 80 parts of oxypropylated glycerol, 20 parts thereof were used plus 60 parts of oxypropylated glycol, 2,000 molecular weight. The foam again was found to have good properties and the bond strength between the foam and the vinyl measured at 5.9 pounds/inch. This shows a further improvement in the dielectric heat sealing properties of the foam when, along with the inclusion of a polar reactive-hydrogen-containing material in the foam-forming reaction mixture, a blend of a polyether triol and a polyether diol is used. The properties of the foam of this example and the bond strength are provided in the table below.

TABLE

|  | Ex. 1 | Comp. Test | Ex. 2 |
| --- | --- | --- | --- |
| Foam Properties |  |  |  |
| Density (lbs. per cu. ft.) | 1.55 | 1.60 | 1.47 |
| Tensile Strength (lbs. per sq. in.) | 20.3 | 20.0 | 17.7 |
| Tear Strength (lbs. per linear in.) | 2.1 | 2.0 | 2.9 |
| Dielectric Sealability | YES | NO | YES |
| Bond Strength (lbs. per in.) | 4.5 | 0 | 5.9 |

EXAMPLE 3

The identical procedure of Example 2 was employed except that the voltage used to dielectrically seal the foam to the vinyl averaged 650 volts instead of the 360 volts of Example 2. As a result of this increase in voltage, the resulting bond strength between the foam and the vinyl measured at 9.6 pounds per inch. Thus an increase in bond strength resulted from the increase in voltage.

What is claimed is:

1. A flexible dielectrically heat sealable, polyether polyurethane foam comprising the reaction product of:
   A. polyether polyol,
   B. organic polyisocyanate,
   C. foaming agent,
   D. catalyst,
   E. 5 to 30 percent by weight based on the total weight of the polyurethane foam forming reaction mixture of a polar, reactive hydrogen containing compound which is the product of partially cyanoethylating a polyol having from 2 to 8 hydroxyl groups.

2. The composition of claim 1 wherein said compound contains at least one cyanoethyl group per hydroxyl group.

3. The composition of claim 2 wherein said compound is selected from the group consisting of
   tris-(2-cyanoethyl)glucose,
   tris-(2-cyanoethoxypropyl)-bis-(hydroxypropyl) glucose,
   hexakis-(2-cyanoethyl) sucrose,
   hexakis-(2-cyanoethoxypropyl)-bis-(hydroxypropyl) sucrose,
   hexakis-(2-cyanoethoxyethyl)-bis-(hydroxyethyl) sucrose,
   bis-(hydroxy-polyoxypropyl)-bis-(2-cyanoethylpolyoxypropyl) methyl glucoside,
   bis-(hydroxy-polyoxypropyl)-bis-(2-cyanoethylpolyoxypropyl) pentaerythritol, and
   tris-(hydroxy-polyoxypropyl)-tris-(2-cyanoethylpolyoxypropyl) sorbitol.

4. The composition of claim 2 wherein said polyol is a saccharide or an alkylene oxide adduct of a saccharide.

5. The composition of claim 4 wherein said proportion ranges from about 10 to about 25 percent by weight.

6. The composition of claim 5 which also comprises a blend of a polyether triol having a molecular weight range of about 1,000–8,000 and a diol having a molecular weight range of about 60–3,000, the weight ratio of said triol to said diol ranging from about 1:8 to about 6:8.

7. The composition of claim 6 wherein said polar compound is bis-(hydroxy-polyoxypropyl)-bis-(2-cyanoethylpolyoxypropyl)methyl glucoside.

8. The method of imparting dielectrically heat sealable properties to a flexible, polyether polyurethane foam which comprises incorporating in a polyether polyurethane foam-forming composition a proportion, ranging from about 5 to about 30 percent by weight, of a polar, reactive-hydrogen-containing compound which is the product of partially cyanoethylating a polyol having from 2 to 8 hydroxyl groups.

9. The method of claim 8 wherein said polyol is a saccharide or an alkylene oxide adduct of a saccharide.

10. The method of claim 8 wherein said polar compound is bis-(hydroxy-polyoxypropyl)-bis-(2-cyanoethylpolyoxypropyl)methyl glucoside.

* * * * *